United States Patent
Sasamoto et al.

(10) Patent No.: US 7,689,100 B2
(45) Date of Patent: Mar. 30, 2010

(54) DIGITAL SIGNAL RECORDING/REPRODUCING APPARATUS

(75) Inventors: Manabu Sasamoto, Yokohama (JP); Hiroo Okamoto, Yokohama (JP); Toshifumi Takeuchi, Yokohama (JP); Masaru Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1488 days.

(21) Appl. No.: 10/928,242

(22) Filed: Aug. 30, 2004

(65) Prior Publication Data

US 2005/0025458 A1 Feb. 3, 2005

Related U.S. Application Data

(63) Continuation of application No. 09/571,656, filed on May 15, 2000, now Pat. No. 6,804,453.

(30) Foreign Application Priority Data

May 13, 1999 (JP) .................................. 11-132331

(51) Int. Cl.
H04N 5/91 (2006.01)
H04N 7/26 (2006.01)
(52) U.S. Cl. ........................................ 386/94; 386/124
(58) Field of Classification Search ................... 386/94, 386/46, 109, 11, 112, 125, 124, 45
See application file for complete search history.

(56) References Cited

U.S. PATENT DOCUMENTS 5,134,499 A * 7/1992 Sata et al. .................... 386/109

| | | | |
|---|---|---|---|
| 5,621,578 A | 4/1997 | Matsumi et al. | |
| 5,719,943 A | 2/1998 | Amada et al. | |
| 6,167,136 A | 12/2000 | Chou | |
| RE37,052 E | 2/2001 | Park | |

(Continued)

FOREIGN PATENT DOCUMENTS

EP 0762417 A2 3/1997

(Continued)

OTHER PUBLICATIONS

Licensing Requirements for the CSS DVD Copy Protection Method, Michael Moradzadeh, Intel Corporation, dated Sep. 1997.

(Continued)

*Primary Examiner*—Robert Chevalier
(74) *Attorney, Agent, or Firm*—Antonelli, Terry, Stout & Kraus, LLP.

(57) ABSTRACT

A digital signal recording apparatus is disclosed, which is capable of protecting the copyright of the analog input information encoded into a first digital signal in a recording medium. A second digital signal encrypted based on the key information and the input analog signal encrypted based on the key information are converted into a second digital signal and encrypted, and the resulting signal is selectively recorded in a recording medium. The digital signal recording apparatus further comprises a circuit for encrypting the digital signal converted from the input analog signal with a key obtained by a predetermined calculation of the key information according to a scheme similar to the second digital signal protection scheme through a digital interface, and a signal recording circuit for recording the key information and the encrypted digital signal in a recording medium.

9 Claims, 11 Drawing Sheets

U.S. PATENT DOCUMENTS 6,289,102 B1 9/2001 Ueda et al.
2007/0154184 A1* 7/2007 Hatanaka et al. .............. 386/98

FOREIGN PATENT DOCUMENTS

| JP | 1-227271 | 9/1989 |
| JP | 2-41051 | 2/1990 |
| JP | 8-31096 | 2/1996 |
| JP | A-8-56350 | 2/1996 |
| JP | 8-163119 | 6/1996 |
| JP | 9-284342 | 10/1997 |
| JP | 10-208386 | 8/1998 |
| WO | WO97/14147 | 4/1997 |

OTHER PUBLICATIONS

"5C Digital Transmission Content Protection White 2. Paper, Revision 1.0, Jul. 14, 1998".

* cited by examiner

DATA SECTOR FORMAT

| | 6341 | 6342 | 6343 | 6344 | 6345 | |
|---|---|---|---|---|---|---|
| (1) | "1" | "2" | "0" | "0" | RESERVED | Kb1(0) |
| (2) | "1" | "1" | "0" | "0" | RESERVED | Kb1(1) |
| (3) | "1" | "0" | "0" | "0" | RESERVED | Kb1(2) |
| (4) | "1" | "2" | "1" | "0" | RESERVED | Kb2(0) |
| (5) | "1" | "1" | "1" | "6" | RESERVED | Kb2(1) |
| (6) | "1" | "0" | "1" | "0" | RESERVED | Kb2(2) |
| (7) | "1" | "2" | "1" | "0" | RESERVED | Kb2(0) |

⋮

| LEAD-IN AREA | PROGRAM 1 | PROGRAM 2 | ‑ ‑ ‑ ‑ ‑ |
|---|---|---|---|
| 601 | 602 | 603 | |

# DIGITAL SIGNAL RECORDING/REPRODUCING APPARATUS

CROSS-REFERENCE TO RELATED APPLICATIONS

This application is a continuation of application Ser. No. 09/571,656 filed on May 15, 2000 now U.S. Pat. No. 6,804,453. The contents of application Ser. No. 09/571,656 are hereby incorporated herein by reference in their entirety.

BACKGROUND OF THE INVENTION

The present invention relates to a digital signal recording/reproducing apparatus for recording digital signals on a recording medium and/or reproducing the signals from the medium, or in particular to a digital signal recording apparatus having the function of protecting the copyright of the digital signal recorded in a recording medium.

The recent progress of the research on the compression of video and audio data using the digital technique has facilitated the storage and transmission of the data. This has greatly promoted the digitization of the broadcasting techniques.

A system is known, for example, in which analog video and audio signals are encoded by digital compression with high efficiency using the MPEG (moving picture experts group) standard and broadcast through a satellite or a coaxial cable. An apparatus for receiving the digital broadcasting is a digital broadcast receiver called the set top box.

A technique for receiving the digital signal transmitted with a plurality of information multiplexed to select the desired program is described in JP-A-8-56350.

As a home-use apparatus for recording and reproducing video and audio signals, on the other hand, an optical disc recorder is under development, which is capable of recording and reproducing the digital video and audio signal compressed and encoded digitally for the digital TV broadcasting, etc.

The digital broadcast receiver and the optical disc recorder are connected to each other by a digital interface, and are capable of storing the received digital broadcast with a high quality. The digital signal transmitted through a digital interface, if fee-charging or the need arises otherwise, requires protection to prevent illegal duplication.

A method for protecting the digital signal transmitted through the digital interface is described, for example, in "5C Digital Transmission Content Protection White Paper, Revision 1.0, Jul. 14, 1998".

SUMMARY OF THE INVENTION

When the optical disc recorder described above has the function of encoding an analog signal input thereto into a digital signal of the same format as for the digital broadcasting and recording it in a recording medium, the recording operation is required to be compatible with the recording medium for recording data using the digital signal protection technique described above.

An object of the present invention is to provide a digital signal recording/reproducing apparatus which solves the problem mentioned above and can protect the copyright of the digital signal on the recording medium for the analog input information encoded into a digital signal.

Another object of the invention is to provide a digital signal recording/reproducing apparatus in which the external analog information encrypted and recorded in a DVD medium for copyright protection are decoded and reproduced from the same DVD medium.

According to an aspect of the invention, there is provided a digital signal recording apparatus comprising: an encoder circuit which encodes an input analog signal into a digital signal; a key information generating circuit which generates at least one key information; a key generating circuit which generates a key by executing a predetermined calculation on the key information input thereto; an encryption circuit which is supplied with the key and the digital information, and encrypts and outputs the digital signal using the same key; and a recording circuit which records at least the key information described above and recording it in a predetermined area of the recording medium together with the encrypted digital signal.

Other objects, features and advantages of the present invention will become apparent from the following detailed description of the embodiments of the invention taken in conjunction with the accompanying drawings.

DESCRIPTION OF THE EMBODIMENTS

An embodiment of the invention will be explained below with reference to the accompanying drawings.

Figure 1:
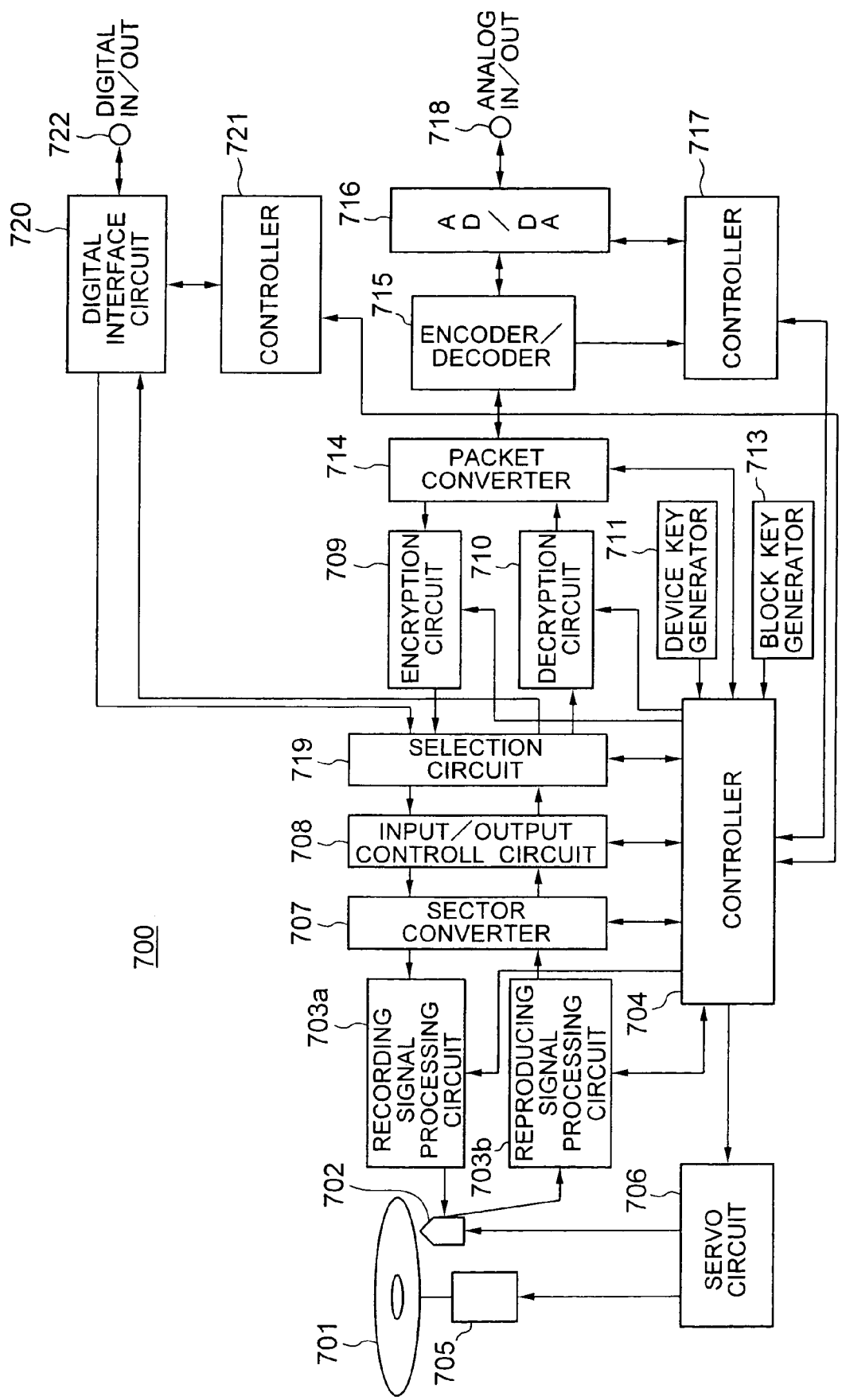
FIG. 1 is a diagram showing a configuration of a digital signal recording/reproducing apparatus 700 according to an embodiment of the invention.

FIG. 1 is a block diagram showing a digital signal recording/reproducing apparatus 700 using an optical disc as a recording medium. In FIG. 1, reference numeral 701 designates an optical disc, numeral 702 an optical pickup, numeral 703a a recording signal processing circuit for generating a recording signal at the time of recording, numeral 703b a reproducing signal processing circuit for demodulating the reproducing signal at the time of reproduction, numeral 704 a controller such as a microprocessor, numeral 705 a spindle motor, and numeral 706 a servo circuit for controlling the rotational speed of the optical disc 701 and the position and focus of the optical pickup 702. Numeral 707 designates a sector converter for converting the packet data into the user data for the data sector described later or retrieving the packet data from the user data, and numeral 708 an input/output controller for processing the time stamp for the packet data at the time of recording and controlling the output timing of the packet data at the time of reproduction. Numeral 709 designates a data encryption circuit for recording the digital signal converted from the analog signal, numeral 710 a data decryption circuit for reproducing the digital signal and converting it into an analog signal, numeral 711 a device key generator for generating a device key providing the seed of the data key supplied to the data encryption circuit 709 or the data decryption circuit 710 when encrypting or decrypting the digital signal, and numeral 713 a block key generator for generating a block key providing another seed of the data key used for encrypting or decrypting the digital information. Numeral 714 designates a packet converter, numeral 715 a digital encoder/decoder, numeral 716 an analog-to-digital (A/D) converter, and numeral 717 a controller such as a microprocessor for controlling the digital encoder/decoder 715 and the analog-to-digital converter 716. Numeral 718 designates an analog signal input/output terminal, numeral 719 a selection circuit for recording/reproducing data, numeral 720 a digital interface circuit connected to the selection circuit 719, and numeral 721 a controller such as a microprocessor for controlling the digital interface circuit 720. Numeral 722 designates a digital signal input/output terminal.

Figure 2:
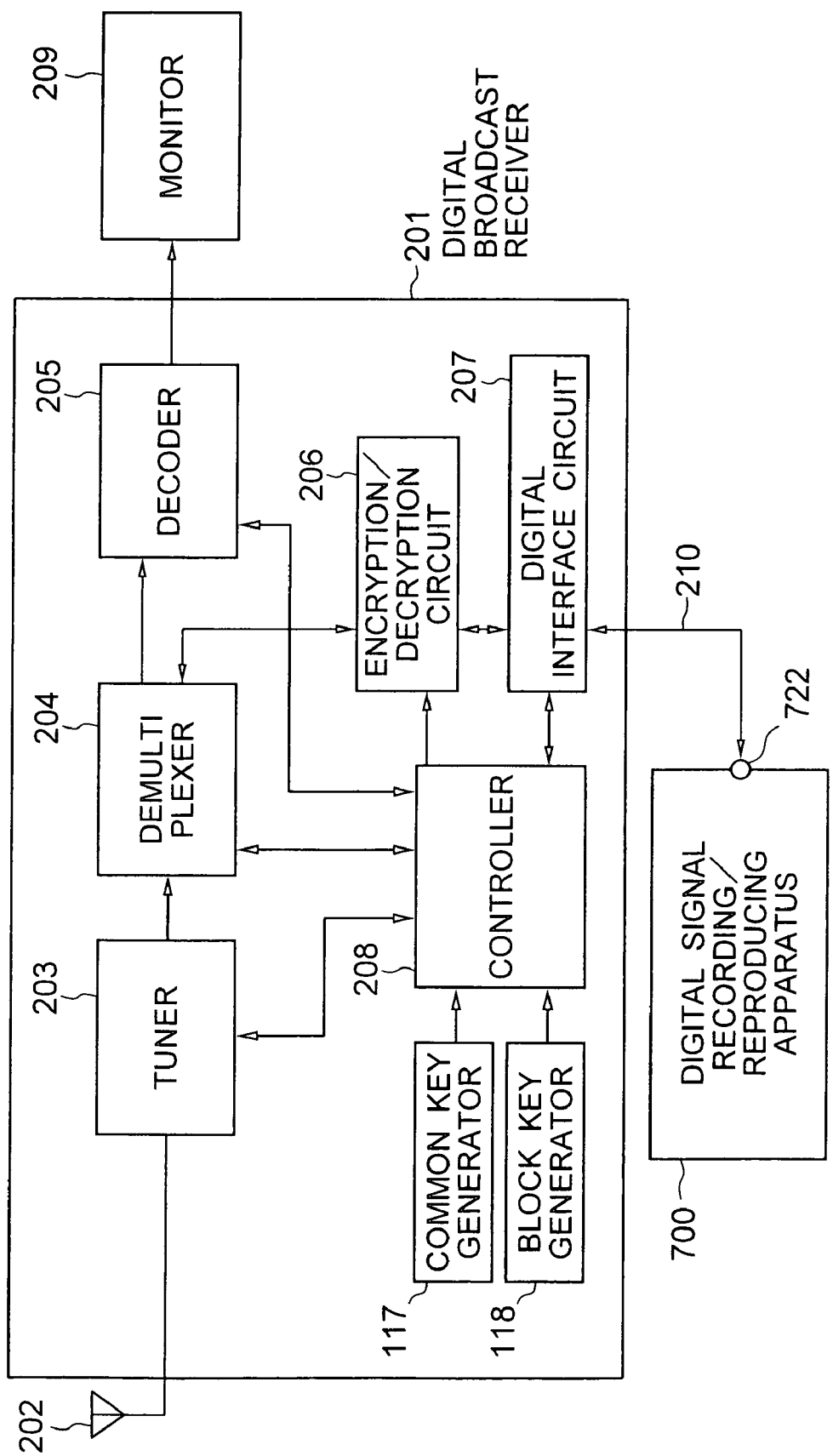
FIG. 2 is a block diagram showing an example configuration including a digital broadcast receiver 201 and the digital signal recording/reproducing apparatus 700.

FIG. 2 is a diagram showing a configuration in which the digital broadcast receiver and the digital signal recording/reproducing apparatus 700 shown in FIG. 1 are connected by a digital interface bus. Numeral 201 designates a digital broadcast receiver, numeral 202 an antenna, and numeral 209 a monitor. Numeral 203 designates a tuner, numeral 204 a demultiplexer, numeral 105 a decoder, numeral 206 an encryption/decryption circuit for protecting the signal on the digital interface bus, numeral 207 a digital interface circuit, numeral 208 a controller for controlling the operation of the digital broadcast receiver 201, and numeral 210 a digital interface bus. The digital interface circuit 207 and the digital interface circuit 720 shown in FIG. 1 are for realizing a protocol such as a high-speed digital bus interface including IEEE1394, for example, and has the function of transmitting data at high speed while maintaining the time intervals of the input packet data.

The digital compressed video signal is transmitted in the form of data in packets containing time-division multiplexed signals of a plurality of channels. In FIG. 2, the digital broadcast signal received at the antenna 202 is demodulated by the tuner 203, and then the required digital compressed video signal is selected by the demultiplexer 204. The digital compressed video signal thus demultiplexed is decoded into a normal video signal at the decoder 205, and output to the monitor 209. The receiving signal, if scrambled or otherwise processed, is descrambled in the multiplexer 204 and decoded. In the case where the received digital broadcast signal is recorded by the digital signal recording/reproducing apparatus 700, the digital compressed video signal to be recorded and the related information are selected by the demultiplexer 204, and encrypted by the encryption/decryption circuit 206 using a common key shared with the digital broadcast receiver 201 and the digital signal recording/reproducing apparatus 700. The resulting signal is input to and recorded in the digital signal recording apparatus 700 from the input/output terminal 722 of the digital signal recording/reproducing apparatus 700 through the digital interface circuit 207. At the time of reproducing the recorded digital broadcast signal, on the other hand, the digital compressed video signal and the like reproduced in the digital signal recording/reproducing apparatus 700 is output from the input/output terminal 722 to the digital interface circuit 207. The digital compressed video signal or the like input to the digital interface circuit 207 is decoded by the encryption/decryption circuit 206 and, by the demultiplexer 204 and the decoder 205, is processed in the same manner as at the time of normal broadcast receiving, and output to the monitor 209.

Figure 3:
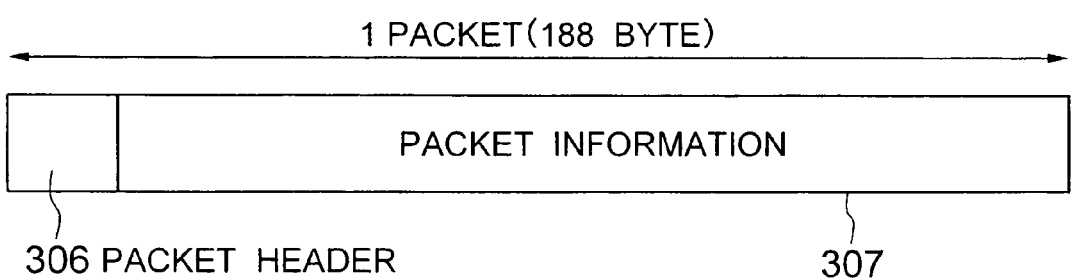
FIG. 3 is a diagram showing the structure of a packet used for a digital video compressed signal.

FIG. 3 is a diagram showing a structure of the packet of the digital video compressed signal. Each packet is configured with a fixed length of, say, 188 bytes, and includes a 4-byte packet header 306 and 184-byte packet information 307. The digital compressed video signal is arranged in the area of the packet information 307. Also, the packet header 307 is configured with information including the type of the packet information.

Figure 4:
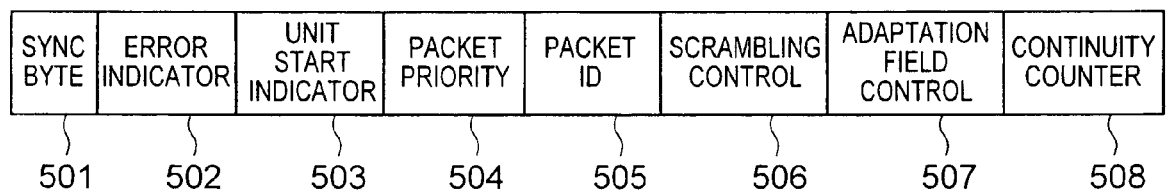
FIG. 4 is a diagram showing the structure of a packet header 306 shown in FIG. 3.

FIG. 4 shows a structure of the packet header 306. Numeral 501 designates a sync byte indicating the head of the packet, numeral 502 an error indicator showing the presence or absence of an error, numeral 503 a unit start indicator showing the start of a unit, numeral 504 a packet priority indicating the degree of importance of the packet, numeral 505 a packet ID indicating the type of the packet, numeral 506 a scrambling control indicating the presence or absence of a scramble, numeral 507 an adaptation field control indicating the presence or absence of the additional information and the packet information, and numeral 508 a continuity counter counted up for each packet.

Figure 5A:
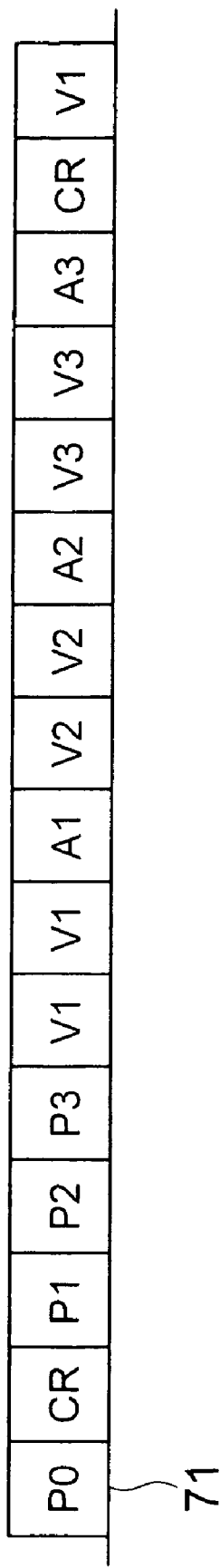
FIGS. 5A and 5B are diagrams showing the structure of digital broadcast transmission signals and signals selected from the transmission signals.
Figure 5B:
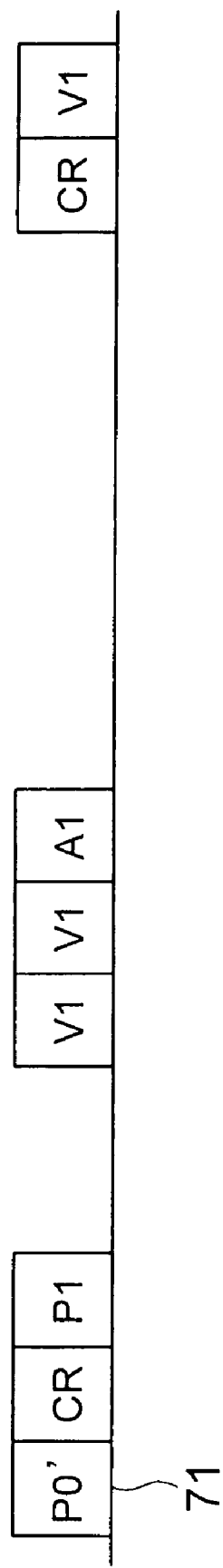

FIGS. 5A and 5B show an example structure of the digital broadcast transmission signals and the signals selected from the transmission signals. Numeral 71 designates the single packet shown in FIG. 3. Normally, the audio signal, the information on the program, etc. are added to the video signal and the program for a plurality of channels is transmitted by being time-division multiplexed.

FIG. 5A shows an example of the programs of three channels multiplexed. Reference characters V1, V2, V3 designate the video signals of the respective channels, and characters A1, A2, A3 the packets of the audio signal of the respective channels. A single channel may be configured with a plurality of video or audio data. Characters P0, P1, P2, P3 designate the information on the programs. Each packet is assigned a different packet ID 505, whereby the contents of a particular packet can be identified.

The packet P0 contains information on the transmission signal as a whole shown in FIG. 5A, in which packets for a program association table for recognizing the packet ID assigned to each program and the program guide information are multiplexed and transmitted by time division. Characters P1, P2, 3 designate information on the respective programs, in which packets for a program map table for recognizing the packet ID assigned to the video and audio packets of a particular channel and packets for the scramble information are transmitted by time-division multiplexing. Normally, a predetermined value such as 0 is assigned to the packet ID of the program association table.

At the time of receiving, the packet ID assigned to the program map table of the program to be received is recognized with reference to the program association table. Then, the packet ID assigned to the video and audio packets is recognized with reference to the program map table of the program to be received. The video and audio packets are demultiplexed and the digital compressed data is decoded. At the same time, the program clock reference is extracted, so that the operation of the decoding circuit is controlled in such a manner that the timing of decoding the digital compressed data by the decoder is synchronized with the encode timing.

The packet CR contains the program clock reference information for assuring synchronization at the time of decoding the digital compressed data.

Of course, the number of channels multiplexed may be 4 channels, for example, instead of 3 channels, or other information may also be multiplexed.

FIG. 5B shows only the information on the first channel and the related program information selected from FIG. 5A. When recording the first channel, the particular information is output from the digital broadcast receiver 201 to the recording/reproducing apparatus 700. Other information may of course be recorded together. Also, in order to facilitate the reproduction processing, the information in the packet may be partially altered. For example, the information in the program association table are changed to the information only on the program to be recorded, thereby eliminating the need of channel selection at the time of reproduction.

Figure 6:
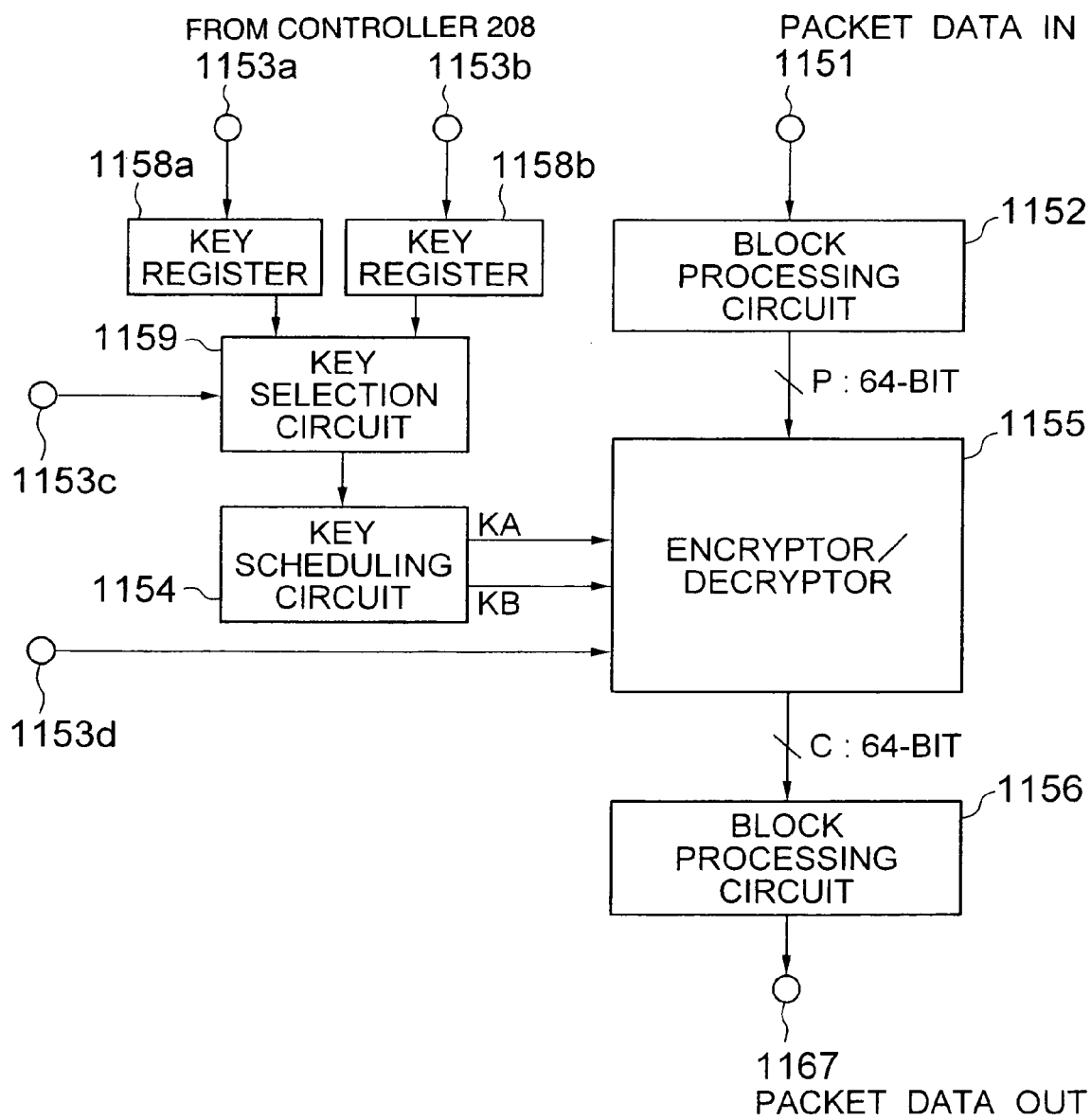
FIG. 6 is a block diagram showing an example configuration of a data encryption circuit 709 and a data decryption circuit 710 shown in FIG. 1 and a data encryption/decryption circuit 206 shown in FIG. 2.

FIG. 6 shows a configuration of the encryption/decryption circuit 206 shown in FIG. 2. Numeral 1151 designates a packet data input terminal, numeral 1157 designates a packet data output terminal, numerals 1153a, 1153b data key input terminals, numeral 1153c a data key selection signal input terminal, numeral 1153d a processing mode selection signal input terminal, numeral 1152, 1156 block processing circuits, numeral 1154 a key scheduling circuit, numeral 1155 an encryptor/decryptor, numeral 1158a, 1158b data key registers, and numeral 1159 a data key selection circuit. The encryption/decryption circuit 206 encrypts and outputs each input packet data using a predetermined data key. In the process, the safety of the packet data flowing along the digital interface bus 210 can be improved by updating the data key at predetermined time intervals.

In order to prevent an error such as a bit error which may occur during transmission, for example, from affecting the succeeding data, or in other words, in order to reduce the chance of error propagation, the encryptor/decryptor 1155 uses a block cypher which can be realized with a simple circuit configuration for each block configured with a plurality of bits. Now, the encryption operation will be explained.

The packet data input from the input terminal 1151 is first segmented into blocks P each having a plurality of bits at a block processing circuit 1152. Assume that each block has 64 bits, for example. The blocks are sequentially encrypted by the encryptor/decryptor 1155, and a block C is output as a result. In a block processing circuit 1156, the block is restored to the format of the packet data and output to the output terminal 1157. The data key constituting an encryption key is input by the controller 208 from data key input terminals 1153a and 1153b, and stored in data key registers 1158a, 1158b. For example, the current data key is stored in the data key-register 1158a, and the next data key to be switched to is stored in the data key register 1158b.

A signal indicating the data key register 1158a or 1158b having the data key to be selected is input by the controller 208 from a data key select signal input terminal 1153c, and the data key selected is output from a data key selector 1159. For the present purpose, assume that the data key of the key register 1158a has been selected. The data key thus selected is converted into subkeys KA, KB in a schedule circuit 1154 and supplied to an encryptor/decryptor 1155. Assuming that the data key has a length of 56 bits and the subkeys each have a length of 32 bits, the most significant 32 bits of the data key are assigned to KA, and the sum of the most significant 32 bits and the least significant 32 bits of the data key is assigned to KB.

When changing the data key, a signal is input from the data key select signal input terminal 1153c so that a signal may be output from the data key register 1158b by the controller 208. Before all the blocks of a given packet data are completely encrypted, the select output of the data key selector is not switched to the next packet data.

A method for increasing the robustness is also available by executing an exclusive OR, for example, between the output of the encryptor/decryptor 1155 and the input of the encryptor/decryptor 1155 and the resulting output is fed back for each block.

Figure 7:
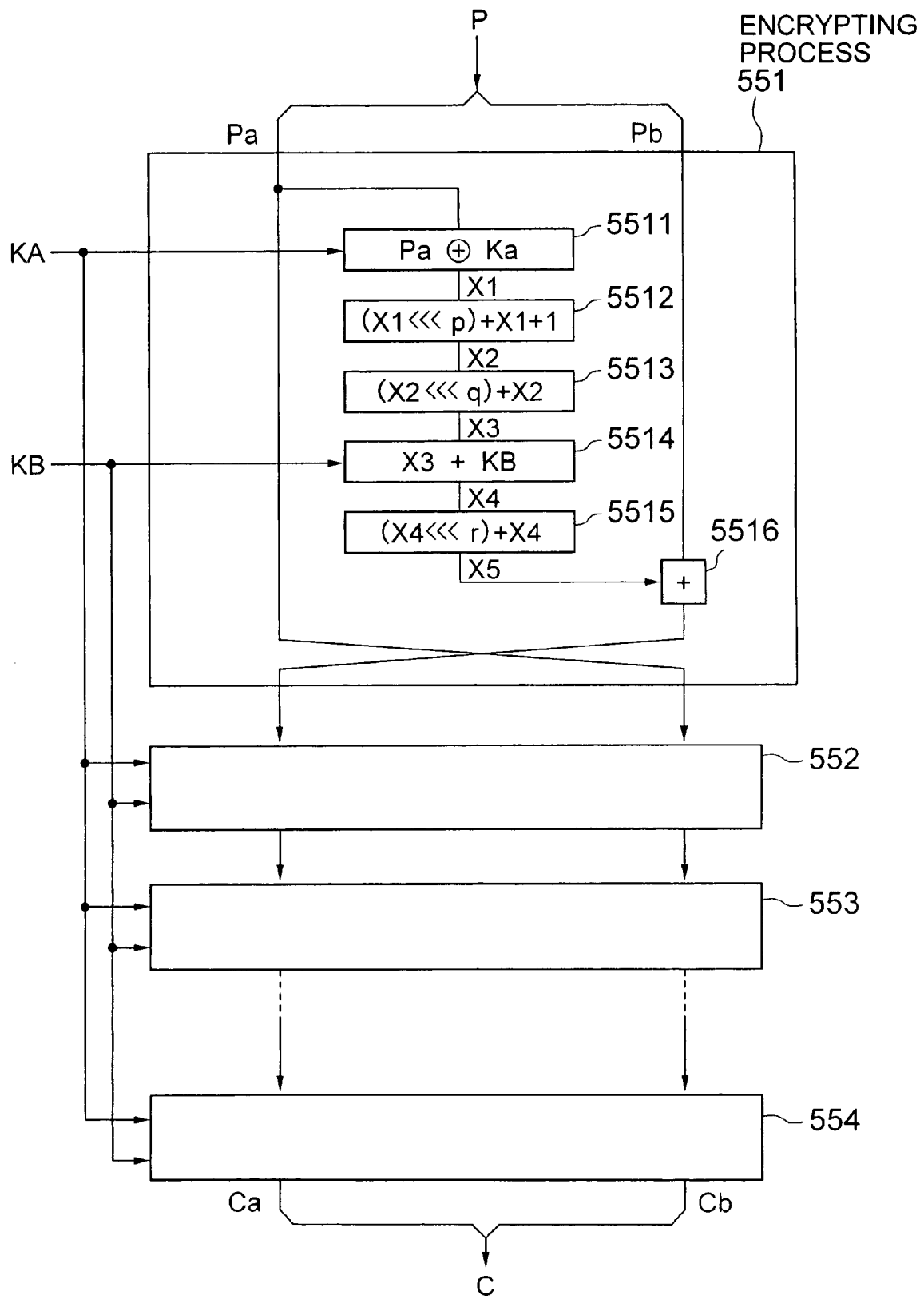
FIG. 7 is a diagram showing a configuration of an encryptor/decryptor 1155 shown in FIG. 6.

FIG. 7 shows a configuration example for the encrypt operation of the encryptor/decryptor 1155 of FIG. 6. In FIG. 7, numerals 551, 552, 553, 554 designate encryption processing units, characters Pa, Pb the high-order and low-order bits, respectively, of the input block data P, characters Ca, Cb encrypted data, and characters KA, KB subkeys. As shown in FIG. 7, the block P of 64 bits, for example, is separated into the most significant 32 bits Pa and the least significant 32 bits Pb. The bits Pa, Pb are subjected to the exclusive OR operation (5511), the bit shift and addition (5512, 5513, 5515: A<<<p indicates that A is subjected to the leftward rotational bit shift by p bits) and the addition (5514, 5516) in the encryption processing unit 551. The result of this operation is input to the succeeding encryption processing units 552, 553 for performing the operation similar to the encryption processing unit 551, and by performing the repetitive operation in a plurality of stages, the encrypted block C is obtained from the data Ca, Cb output from the encryption processing unit 554 in the last stage.

The foregoing is the description of the encrypt operation of the encryption/decryption circuit 206 of FIG. 2. In the case of the decrypt operation, an encrypted block can be decrypted by performing the operation of the encryptor/decryptor 1155 of FIG. 7 in reverse direction. The operation 5516 shown in FIG. 7, however, is assumed to be a subtract operation. Also, the same subkeys KA, KB as for the encryption must of course be used.

In the case where the packet data to be recorded require no protection such as in the case where the free duplication of the program to be recorded is permitted, the packet data may be recorded in the optical disc directly without encryption. This can be realized, for example, by switching between the function of encrypting/decrypting the input packets and the function of passing without doing anything in the encryption/decryption circuit 206 of FIGS. 2 and 6. In the encryption/decryption circuit 206 of FIGS. 2 and 6, the blocks can be passed without encryption or decryption, though not shown, by fixing the input X5 to the arithmetic unit 5516 of FIG. 7 to zero in response to the processing mode select signal input through the processing mode select signal input terminal 1153d of FIG. 6. According to this method, the operation can be switched while maintaining a constant pass delay time of the input packet. Also, though not shown, an alternative method is available, in which a switching circuit is arranged in the stage before the output terminal 1157 for switching between the function in which the packet data input from the input terminal 1151 is output to the output terminal 1157 without passing through the block processing circuit 1152, the encryptor/decryptor 155 and the block processing circuit 1156 on the one hand and the function in which the packet data output from the block processing circuit 1156 is output to the output terminal 1157 on the other hand. Thus, the processing mode select signal input through the processing mode select signal input terminal 1153d is input to the switching circuit thereby to switch between the packet data output from the block processing circuit 1156 and the packet data input to the input terminal 1157.

Figure 8:
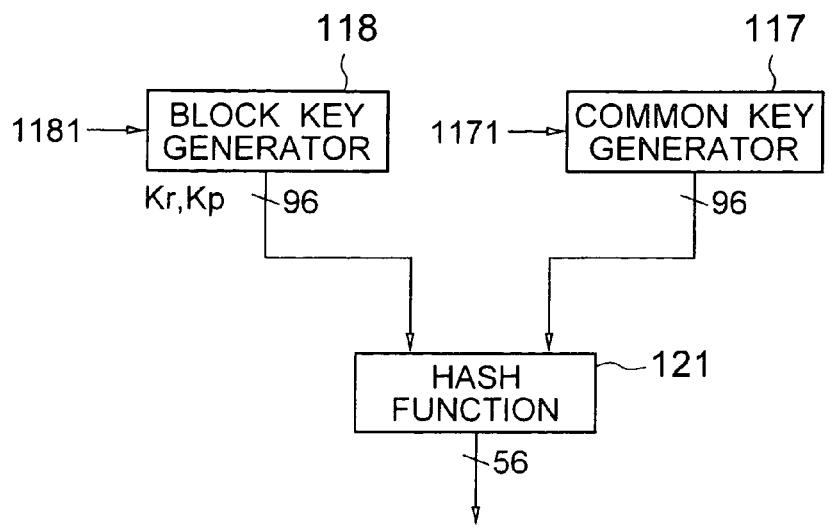
FIG. 8 is a block diagram showing the manner in which a data key is generated in a controller 704 to be supplied to the data encryption circuit 709 and the data decryption circuit 710 of FIG. 1 and also a data key is generated in a controller 208 to be supplied to the data encryption/decryption circuit 206 shown in FIG. 2.

FIG. 8 is a diagram showing the manner in which a data key supplied to the encryption/decryption circuit 206 of FIG. 2 is generated in the controller 208. A common key generator 17 is a random number generator for generating a random number of 96 bits in response to a command 1171 from the controller 208, for example, in FIG. 2. The block key generator 118, on the other hand, is a random number generator for generating a random number of 96 bits similarly in response to a command 1181 from the controller 208 of FIG. 2. Numeral 121 designates a hash function calculator. The common key and the block key are subjected to the hash function calculation in the hash function calculator 121, and the resulting 56 bits selected are supplied to the encryption/decryption circuit 206 of FIG. 2 as a data key. The hash function is a function for which the input data is difficult to estimate from the output thereof, and therefore the common key or the block key making up a confidential key cannot be determined from the data key.

Also, by generating the command 1181 from the control circuit 208 of FIG. 2 at predetermined time intervals and thus by repeating the generation of the data key by the calculation described above, the data keys can be successively updated, thus making it possible to improve the safety of the data on the digital interface bus 210.

The common key generated in the common key generator 117 is transmitted to the digital signal recording/reproducing apparatus 700. The block key generated in the block key generator 118, on the other hand, is transmitted to the digital signal recording/reproducing apparatus 700 each time of generation. Also, the timing of updating the data key is also transmitted and recorded together with the encrypted packet data.

The recording and reproducing operation according to this embodiment will be explained again with reference to FIG. 1.

At the time of recording, the encrypted data input from the digital signal input/output terminal 722 is processed as a packet as determined in the digital interface circuit 720. The packet data input is impressed with a time stamp by the input/output controller 708 through the switching circuit 719 and output to the sector converter 707. The time stamp is the time information of the arrival timing of the packet of four bytes, for example. In the sector converter 707, the input packet data is converted into the format of the user data of the data sector described below.

Figure 9:
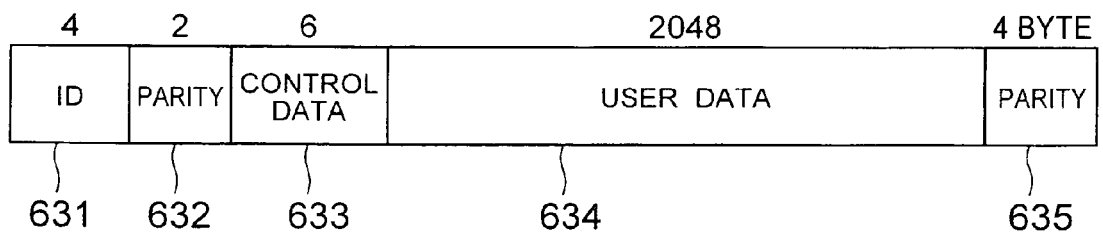
FIG. 9 shows a format of the data sector.

FIG. 9 shows a structure of the data sector. In the data sector, numeral 631 designates ID information of 4 bytes, numeral 632 a parity of 2 bytes for detecting and correcting the error in the ID information 631, numeral 633 the control data of 6 bytes, numeral 634 the user data of 2048 bytes, and numeral 635 a parity having a 4-data area for detecting and correcting the error of the user data 634. Among these data, the packet data shown in FIG. 3 is stored in the user data area 634.

Figure 10:
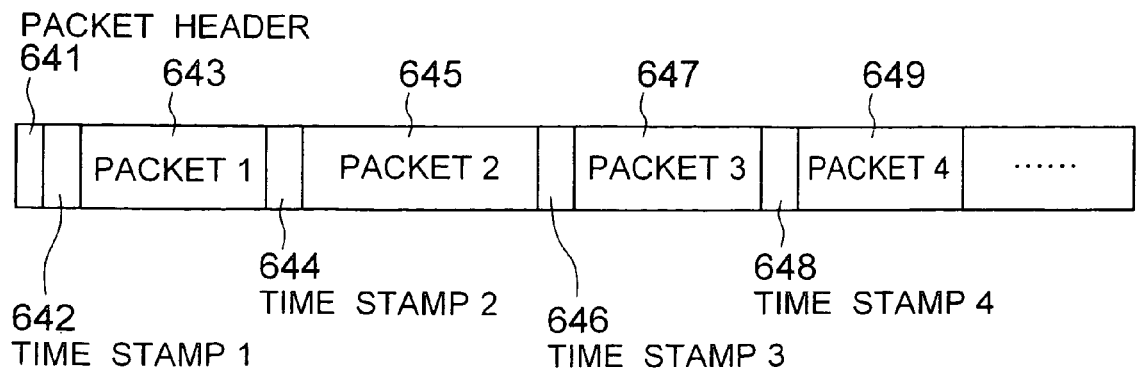
FIG. 10 shows a format of the packet data stored in the user data 634 in the data sector shown in FIG. 9.

FIG. 10 shows a structure of the packet data stored in the user data area 634 of the data sector shown in FIG. 9 converted by the sector converter 707. A plurality of packets impressed with a time stamp are stored. In the case where the data sector is 2048 bytes, about ten packets having time information can be stored. The number of packets stored, for example, is recorded in the packet header 641.

Figure 11:
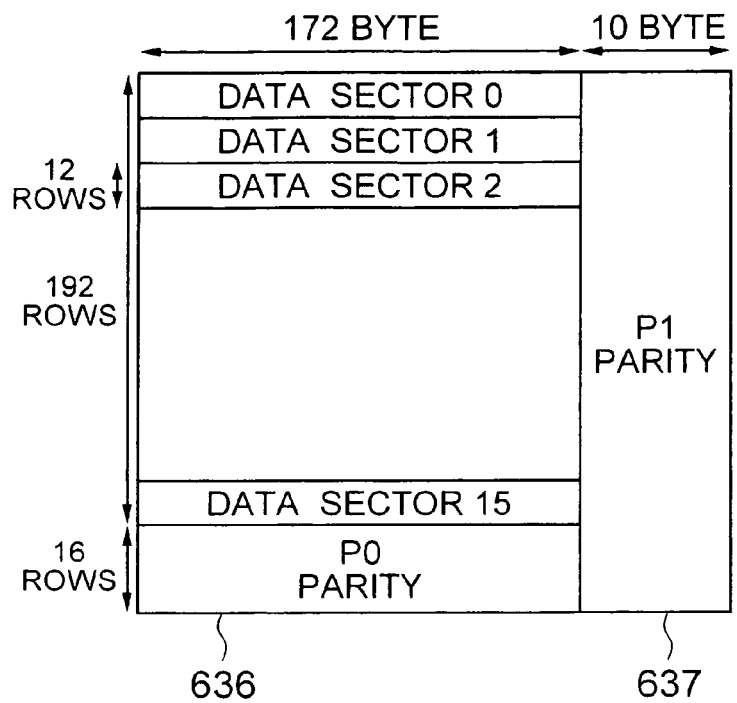
FIG. 11 is a diagram showing the structure of an error correction code attached when the data is recorded in the disc.

FIG. 11 shows the structure of the error correction code added at the time of recording in the disc. First, the data sector is segmented into 172 bytes, to which a first parity (PT parity) of ten bytes for error detection and correction is added. Further, n (16, for example, in this embodiment) data sectors are collected and 16 second parities (PO parity) for error detection and correction are added to the vertical 192 bytes. A 10-byte parity is added also to the PO parity thus obtained.

Figure 12:
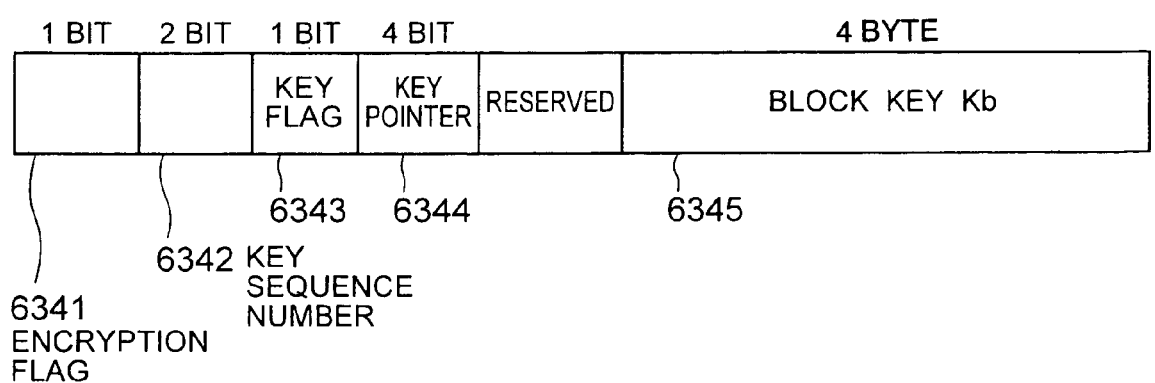
FIG. 12 shows a format of the control data 633 of FIG. 9.

FIG. 12 shows a structure of the control data 633. The block key described above, for example, is stored in this control data 633. Numeral 6341 designates an encryption flag for indicating whether the user data in the data sector for storing the control data 633 is encrypted or not. Numeral 6342 designates a key sequence number for indicating that the succeeding control data is available in the case where the block key cannot be stored in a single control data 633. Numeral 6343 designates a key flag for indicating that the block key stored in the control data has been updated. Numeral 6344 designates a key pointer for indicating the starting position of the packet encrypted with a different data key in the user data. Numeral 6345 designates an area for storing the block key.

Figures 13, 14:
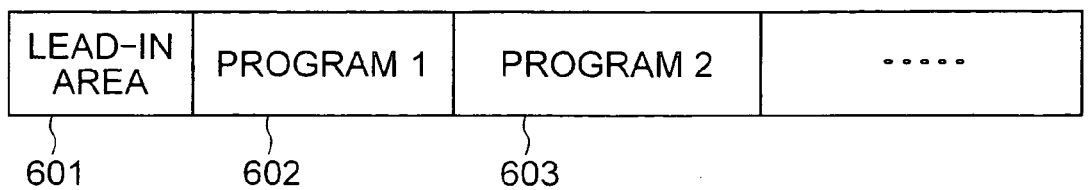
FIG. 13 shows a format for a method of storing the block key kb in the control data 633.
FIG. 14 shows a format of the structure of a file recorded in the disc.

FIG. 13 is a diagram showing a method of storing the block key of 96 bits in the control data area. The block key kb of 96 bits is stored dividedly in three control data kb(0), kb(1) and kb(2). In the process, the encryption flag 6341 is stored as "1" indicating the encryption, and the key sequence number 6342 is stored as "2", "1", "0" in the three control data in that order, where "0" indicates the last part of the division. The key flag 6343 indicates the updating of the stored block key by alternating between "0" and "1". For the updating from the block key kb1 to kb2, for example, "0" changes to "1". Also, the key pointer 6344 indicates the starting position of the packet encrypted by the data key updated. For example, the state not updated is indicated by "0". The line (5) in FIG. 13, for example, indicates that the sixth and subsequent packets are updated with a new data key. This key pointer may alternatively be stored in the packet header 641 of FIG. 10.

Also, the encryption flag and the flag indicating the update position can be stored in part of the time information 642, 643 and so on added to each packet. In such a case, the attribute of the succeeding packets can be determined directly.

FIG. 14 shows a structure of the file recorded on the disc. Numeral 601 designates a lead-in area for storing various parameters. Different programs, etc. are stored in the programs 602 and 603. The common key described above, for example, is stored in the lead-in area 601.

Figure 15:
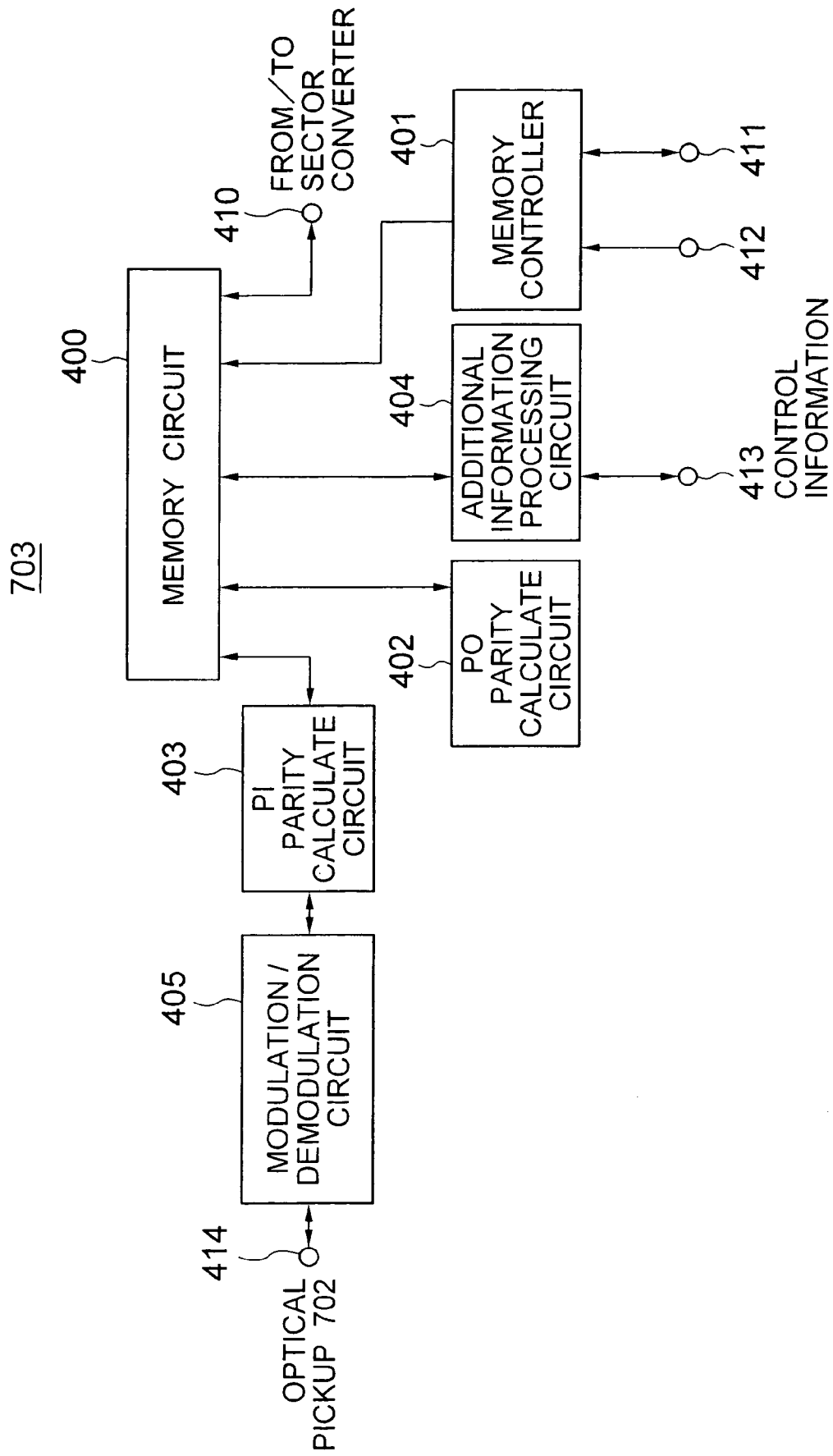
FIG. 15 is a block diagram showing a configuration of a digital recording/reproducing signal processing circuit including a recording signal processing circuit 703 and a reproducing signal processing circuit 703b shown in FIG. 1.

FIG. 15 shows an example configuration of the digital recording/reproducing signal processor 703 including the recording signal processing circuit 703a and the reproducing signal processing circuit 703b shown in FIG. 1. Numeral 400 designates a memory circuit, numeral 401 a memory controller for generating an address for controlling the memory circuit 400 in accordance with the control circuit 704 shown in FIG. 1, numeral 402 a PO parity calculate circuit, numeral 403 a PI parity calculate circuit, numeral 404 an additional information processing circuit for adding the additional information such as the ID information and the control data at the time of recording and acquiring the additional information such as the ID information and the control data at the time of reproduction, based on the setting from the control circuit 704, and numeral 405 a modulation/demodulation circuit for performing the modulation at the time of recording and demodulation at the time of reproduction.

At the time of recording, the recording mode is set by the control circuit 704 of FIG. 1 through the terminals 411, 413. The user data from the sector converter 707 of FIG. 1 is input from the terminal 410, and accumulated in the memory circuit 400 in accordance with the control signal of the memory control circuit 401. In accordance with the setting from the control circuit 704 of FIG. 1 through the terminal 413, on the other hand, the additional information processor 404 generates the control data including the block key for the encrypted input packet data, which are accumulated in the memory circuit 400. In the process, the ID 631, the parity 632, the control data 633 and the parity 635 of FIG. 9 are added into the format of the data sector. After the data required for PO parity calculation are accumulated, n (16 in this embodiment) data sectors are read each time sequentially from the memory circuit 400 and input to the PO parity calculate circuit 402 to perform a predetermined calculation. The result of calculation obtained from the PO parity calculate circuit 402 is accumulated in the memory circuit 400. The data read from the memory circuit 400 is added to the PI parity in the PI parity calculate circuit 403, and though not shown, after being rearranged in a predetermined way, input to the modulation/demodulation circuit 405 with the header added thereto. The signal modulated in a predetermined way in the modulation/demodulation circuit 405 is output through the terminal 414 and through the optical pickup 702 of FIG. 1, is recorded in the optical disc 701.

At the time of reproduction, the reproducing signal reproduced by the optical pickup 702 of FIG. 1 is input to the reproducing signal processing circuit 703*b*, where it is demodulated while the error thereof is detected and corrected. At the same time, the digital signal in the format of the user data 634 of FIG. 9 is output to the sector converter 707. In the reproducing signal processing circuit 703*b*, the disc key and the block key information are also reproduced and sent to the control circuit 704, in which the calculation is performed for the data key reproduction as described above and the result of calculation is supplied to the data decryption circuit 710.

The digital recording/reproducing signal processing circuit 703 shown in FIG. 15 sets a reproduction mode under the control of the controller 704 of FIG. 1 through the terminals 411, 413. The reproducing signal reproduced in the optical pickup 702 from the optical disk 701 and input from the terminal 414, after being demodulated in the modulation/demodulation circuit 405, is subjected to the PI parity calculation in the PI parity calculate circuit 403 and after the error is detected and corrected, accumulated in the memory circuit 400 together with the result of the PI parity calculation. After the data required for PO parity calculation is accumulated, the reproducing signal is read sequentially from the memory circuit 400 in response to the control signal from the memory control circuit 401, and input to the PO parity calculate circuit 402. In the PO parity calculate circuit 402, the calculation is performed with the data described above, so that the data with the error thereof detected and corrected and the result of the PO parity calculation are accumulated again in the memory circuit 400.

The data are read from the memory circuit 400 in a predetermined order, so that only the data free of error including those with the error thereof already corrected are output from the terminal 410 to the sector converter 707 of FIG. 1 with reference to the PO parity described above and the PO parity calculation result. In the additional information processing circuit 404, on the other hand, the block key and the common key are acquired from the data read from the memory circuit 400, and through the terminal 413, sent out to the control circuit 704 of FIG. 1.

The digital recording/reproducing signal processing circuit 703 is not confined to the configuration shown in FIG. 15 but can of course be configured in another way as far as a similar operation can be performed.

Then, in the sector converter 707, the packet data with the time stamp attached thereto and stored in the user data in the reproduced data sector is separated and output to the input/output controller 708. In the input/output controller 708, the packet data free of the time stamp is output at the time point indicated by the time stamp. Then, through the switching circuit 719, the data is processed as a packet in a predetermined way in the digital interface circuit 720 and output from the input/output terminal 722.

The block key and the common key obtained by reproduction are transmitted from the controller 704 to the digital broadcast receiver 201 of FIG. 2. Also, the block key is transmitted to the digital broadcast receiver 201 each time it is updated, and the update timing information of the data key is also transmitted, together with the packet data, by the digital interface circuit 720. The controller 208 of the digital broadcast receiver 201 generates, in a way similar to that for generation of the data key in FIG. 8, the data key using the block key and the common key transmitted from the digital signal recording/reproducing apparatus 700. The data key thus generated is supplied to the encryption/decryption circuit 206. In the encryption/decryption circuit 206 shown in FIG. 6, the data key for decryption is input from the data key input terminals 1153*a* and 1153*b* by the controller 208 of FIG. 2 and stored in the data key registers 1158*a*, 1158*b*. For example, the current data key is stored in the data key register 1158*a*, and the next data key to which the current data key is switched is stored in the data key register 1158*b*. Also, the data key select signal input terminal 1153*b* is supplied with a signal indicating the data key of either the data key register 1158*a* or 1158*b* to be selected, in an operatively interlocked relation with the update timing of the data key transmitted from the digital interface circuit 207. Then the selected data key is output by the data key selector 1159.

In FIG. 2, the packet data input to the digital interface circuit 207 of the digital broadcast receiver 201 is decrypted in the encryption/decryption circuit 206 and after being processed in the demultiplexer 204 and the decoder 205 in the same way as at the time of normal receiving, output to the monitor 209.

Now, an explanation will be given of the operation of recording the analog signal input from the analog signal input terminal 718 of FIG. 1.

In FIG. 1, the analog video and audio signals input from the analog signal input terminal 718 are converted into a digital signal in the A/D converter 716 and input to the digital multiplexer/demultiplexer 715. The digital multiplexer/demultiplexer 715 performs a predetermined compression processing.

Figure 16:
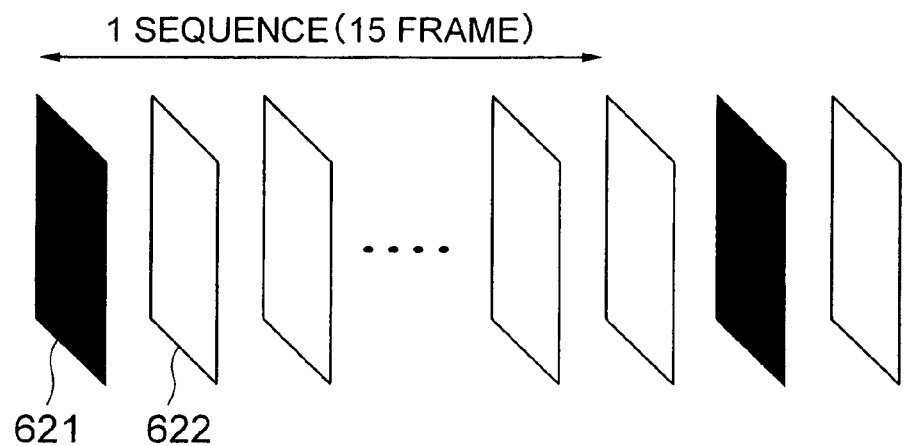
FIG. 16 is a diagram showing the relation between the intra-frame data and the inter-frame data of the digital compressed video signal.

FIG. 16 shows the relation between the intra-frame data compressed for each frame of the digital compressed video signal and the inter-frame data with only the differential information compressed using the prediction from the data in the preceding and subsequent frames as an example of digital compression. Numeral 621 designates an intra-frame, and numeral 622 an inter-frame. The digital compressed video signal contains a predetermined number of frames, say, 15 frames as a sequence including an intra-frame at the head thereof and the remainder as inter-frames compressed using the prediction from the intra-frame. The intra-frame can of course be arranged at other than the head.

Figure 17:
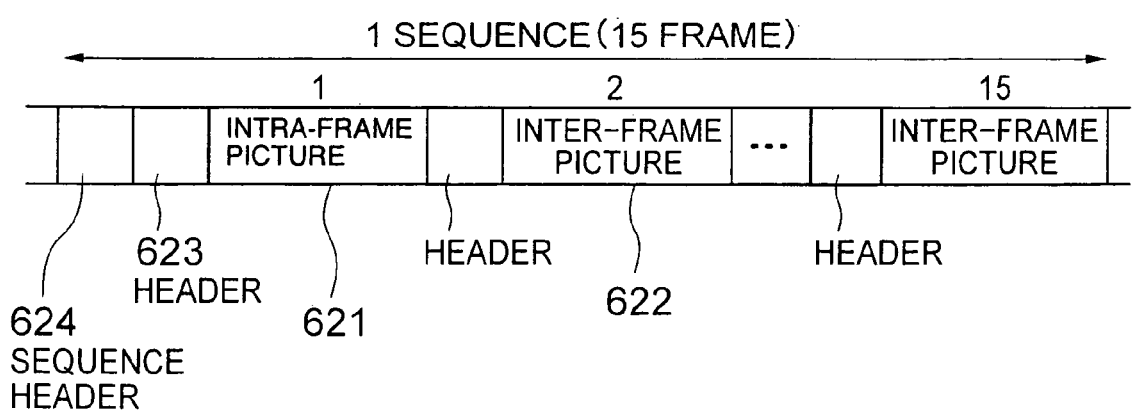
FIG. 17 shows a format of the structure of the digital compressed video signal.

FIG. 17 shows an example configuration of the digital compressed video signal. Numeral 623 designates a picture header attached for each frame, and numeral 624 a sequence header attached for each sequence. The sequence header 624 is configured with a sync signal and information such as the transfer rate. The picture header 623 is configured with identification information as to whether the sync signal, the intra-frame or the inter-frame is involved. Normally, the length of each data changes with the bit rate.

In FIG. 1, the digital compressed video signal and the like output from the digital multiplexer/demultiplexer 715 is converted into the format of a fixed-length packet in the packet converter 714. The digital compressed video signal shown in FIG. 17, for example, is segmented and stored in the area of the packet information 307 shown in FIG. 3. This fixed-length packet data is encrypted for each packet data in the data encryption circuit 709, and input to the input/output controller 708 through the switching circuit 719. The subsequent recording operation is performed in the same manner as the recording operation for the input signal from the digital signal input/output terminal described above.

The data key for encryption is generated in a manner similar to the way for the digital broadcast receiver 201 of FIG. 2. In the case under consideration, however, a device key 711 generated by a device key generator is used instead of the common key for the devices. The block key generator 713 is a random number generator for generating a random number of 96 bits in response to a command from the controller 704. The device key 711 and the block key 713 are subjected to the hash calculation, and 56 bits selected from the calculation result are supplied to the data encryption circuit 709 as a data key. Also, by generating the block keys sequentially in response to the commands generated from the controller 704 at predetermined time intervals and thus by repeating the generation of the data key, the data keys can be updated successively. Also, the device key is stored in the lead-in area 601 of FIG. 14 and at the time of reproduction, is handled as the common key described above.

As the result of the foregoing process, the encrypted packet data recorded in the optical disc 701 can maintain the compatibility as in the case of the operation of recording the input signal from the digital signal input/output terminal described above. Thus, it is possible to reproduce the input signal from the analog input terminal 718 recorded in the optical disc, output it from the digital input/output terminal 722, transmit it to the digital broadcast receiver 201 of FIG. 2, and decrypting the data by sharing the block key and the common key, output them from the monitor 209. Conversely, it is possible to reproduce the packet data input from the digital input/output terminal 722 and recorded in the optical disc according to the aforementioned method, and output it as an analog signal through the data decryption circuit 710, the packet converter 714, the digital multiplexer/demultiplexer 715 and the A/D converter. In this case, the data key supplied to the data encryption circuit 710 is generated in the same manner as described above.

Apart from the recording/reproducing apparatus using an optical disc referred to in the embodiments described above, a recording device lacking the reproduction function is also usable.

Also, the recording medium is not limited to the optical disc, but any other recording medium such as the magnetic disc, the magnetic tape or the semiconductor memory can be equally used for recording by converting an analog signal into a digital signal.

It will thus be understood from the foregoing description that according to this invention, there is provided a digital signal recording apparatus for converting an analog signal into a digital signal and recording the resulting signal in a recording medium, in which a digital signal is encrypted with a key obtained by a predetermined processing of the key information according to a scheme similar to the technique for protecting the digital signal through a digital interface, and recorded in the recording medium wit the key information. This operation permits the encrypted digital signal recorded in the recording medium to be compatible with the recording medium for recording the input signal from the digital signal input/output terminal. It should also be understood that the encryption/decryption applied to this invention can be implemented in software fashion.

What is claimed is:

1. A digital signal recording apparatus comprising:
a first input circuit which inputs an analog signal;
a converter which converts said analog signal into a first digital signal;
a tuner circuit which receives a digital broadcasting information signal and converts said digital broadcasting information signal into a second digital signal; and
a recording circuit which records at least one of said first digital signal and said second digital signal in a predetermined area of a recording medium;
wherein said recording circuit enables generation of key information and enables updating of said key information, and performing a predetermined calculation with said key information to generating a key, and encrypting said first digital and said second digital signal with said key and recording at least one of said first digital signal and said second digital signal, which is encrypted with a compatible method, together with said key information in a predetermined area on said recording medium, and
wherein said first digital signal and said second digital signal have a packet format of a predetermined length.

2. A digital signal recording apparatus according to claim 1,
wherein said recording circuit enables updating of said key information at a predetermined time interval, and timing information capable of identifying the timing at which said recording circuit updates said key information is recorded in a predetermined area of said recording medium.

3. A digital signal recording apparatus according to claim 2,
wherein said recording circuit enables adding of the timing information capable of identifying the timing at which said recording circuit updates said key information to each packet and recording on said recording medium.

4. A digital signal recording apparatus according to claim 1,
wherein said recording circuit enables selection of a function of recording by encrypting at least one of said first and second digital signals and a function of recording at least one of said first and second digital signals without encryption, and encryption flag information indicating whether at least one of said first and second digital signals is encrypted or not is recorded in a predetermined area of said recording medium.

5. A digital signal recording apparatus according to claim 4,
wherein said recording circuit enables attachment of the encrypting flag information indicating whether at least one of said first and second digital signals is encrypted or not to each packet and recording on said recording medium.

6. A digital signal recording apparatus according to claim 1,
wherein said recording circuit records at least one of said first and second digital signals in the format of each sector having a plurality of packets in said recording medium.

7. A digital signal recording apparatus according to claim 1,
wherein said recording medium is an optical disc, and at least one of said encrypted first and second digital signals and said key information are recorded on said optical disc in the format of a plurality of sectors each including a plurality of packets.

8. A digital signal recording apparatus according to claim 1, wherein said recording circuit records one of said first and second digital signals on said recording medium.

9. A digital signal recording method, the method comprising the steps of:
inputting an analog signal;
converting said analog signal into a first digital signal;
receiving a digital broadcasting information signal;
converting said digital broadcasting information signal into a second digital signal; and
recording at least one of said first digital signal and said second digital signal in a predetermined area of a recording medium;
wherein the step of recording includes generating key information and updating of said key information, and performing a predetermined calculation with said key information to generating a key,
wherein the step of recording includes encrypting at least one of said first and second digital signals with said key which is encrypted with a compatible method, and
wherein the step of recording affects recording of one of the first and second digital signals having a packet format with a predetermined length together with said key information in a predetermined area on said recording medium.

* * * * *